United States Patent [19]

Nomura et al.

[11] Patent Number: 4,722,133
[45] Date of Patent: Feb. 2, 1988

[54] TOOL TRANSFER MECHANISM FOR MACHINE TOOLS

[75] Inventors: Kenji Nomura, Aichi; Toshifumi Hasegawa, Ohbu; Shigeru Doi, Nagoya, all of Japan

[73] Assignee: Toyoda Koki Kabushiki Kaisha, Kariya, Japan

[21] Appl. No.: 775,793

[22] Filed: Sep. 13, 1985

[30] Foreign Application Priority Data

Sep. 19, 1984 [JP] Japan .................. 59-197599

[51] Int. Cl.⁴ .................................. B23Q 3/157
[52] U.S. Cl. .................................. 29/568; 414/736
[58] Field of Search .............. 29/568, 26 R, 26 A; 211/1.5; 414/736; 901/41

[56] References Cited

U.S. PATENT DOCUMENTS

| | | | |
|---|---|---|---|
| 3,823,466 | 7/1974 | Jerue | 29/568 |
| 4,121,332 | 10/1978 | Corsi | 29/568 |
| 4,196,506 | 4/1980 | Reed | 29/568 |
| 4,430,717 | 2/1984 | Senda et al. | 29/568 |

FOREIGN PATENT DOCUMENTS

| | | | |
|---|---|---|---|
| 48548 | 4/1980 | Japan | 29/568 |
| 22636 | 3/1983 | Japan . | |
| 1085752 | 4/1984 | U.S.S.R. | 29/568 |

*Primary Examiner*—Z. R. Bilinsky
*Attorney, Agent, or Firm*—Oblon, Fisher, Spivak, McClelland & Maier

[57] ABSTRACT

A tool transfer mechanism for transferring a tool between a gateway position of a tool storage magazine and an exchange position adjacent a spindle which includes a base mounted on a frame, an actuator for rectilinearly moving the base, and a holding arm mounted on the base resiliently biased toward the tool to hold the same. The holding arm is moved outwardly to release the tool when the base is at the gateway position. The base is rotated in accordance with its rectilinear movement to change the posture of the tool between a first posture where the tool is parallel with remaining tools stored in the magazine and a second posture where the tool is parallel with the spindle.

6 Claims, 6 Drawing Figures

TOOL TRANSFER MECHANISM FOR MACHINE TOOLS

BACKGROUND OF THE INVENTION

1. Field of the Invention

The present invention relates to a tool transfer mechanism for machine tools in which a plurality of tools are stored in a storage magazine and are selectively transferred from the storage magazine to a tool spindle on a machine or vice versa.

2. Discussion of the Background

In general, in a vertical machine tool with an automatic tool changing apparatus, a spindle is vertically journalled to a spindle head. A plurality of tools are stored in a storage magazine with respective axes thereof being horizontally oriented. Therefore, in exchanging tools between the spindle and the storage magazine, a tool transfer mechanism has to change the posture of the tool from one where an axis of the tool is vertical to another where it is horizontal, or vice versa, during transfer of the tool.

One example of such a tool transfer mechanism is disclosed in Japanese Patent Application Publication No. 22636/1983, wherein a tool holder which detachably carries a tool is shifted by the tool transfer mechanism between a gateway position of a tool storage magazine and a tool exchange position adjacent a spindle. The tool transfer mechanism has a fork which is attached to a middle portion of a cam shaft and is separably engageable with the tool holder. The cam shaft is rotatably connected to a piston rod of a hydraulic cylinder.

A twisted grooved cam is axially formed on a periphery of the cam shaft and is engaged with a roller that is attached to a fixed frame, so that the cam shaft is rotated by a 90° angle in accordance with its axial movement. A swing plate which is rotatably mounted on the fixed frame is engaged with a spline portion of the cam shaft. A pair of guide bars are fixed to the swing plate to guide the tool holder while the same is being shifted by the fork.

As a result, when the cam shaft is moved by the hydraulic cylinder to shift the tool holder between the gateway position and the exchange position, it is rotated by a 90° angle because of engagement of the grooved cam with the roller. The fork, the swing plate and the guide bars are simultaneously rotated so that a tool carried in the tool holder changes its posture between a horizontal one at the gateway position and a vertical one at the exchange position. However, in such tool transfer mechanism, insofar as the long guide bars are necessary to guide the tool holder, the tool transfer mechanism as a whole becomes cooperatively large and complex.

SUMMARY OF THE INVENTION

It is therefore an object of the present invention to provide a compact and rigid tool transfer mechanism which avoids the drawbacks of known tool transfer mechanisms.

Another object of the present invention is to provide a tool transfer mechanism which is of simple construction and is relatively inexpensive.

Briefly, according to the present invention, these and other objects are achieved by providing a tool transfer mechanism for transferring tool means between a gateway position of a tool storage magazine and an exchange position adjacent a spindle, and which includes a base, an actuator for moving the base between the gateway position and the exchange position, holding arm means mounted on the base and resiliently biased toward the tool means, means for releasing said holding arm means from the tool means while the base is at the gateway position, and means for rotating the base to change the posture of the tool means held on the base between one posture at the gateway position where the tool means is parallel with tool means stored in the tool storage magazine and another posture at the exchange position where the tool means is parallel with the spindle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
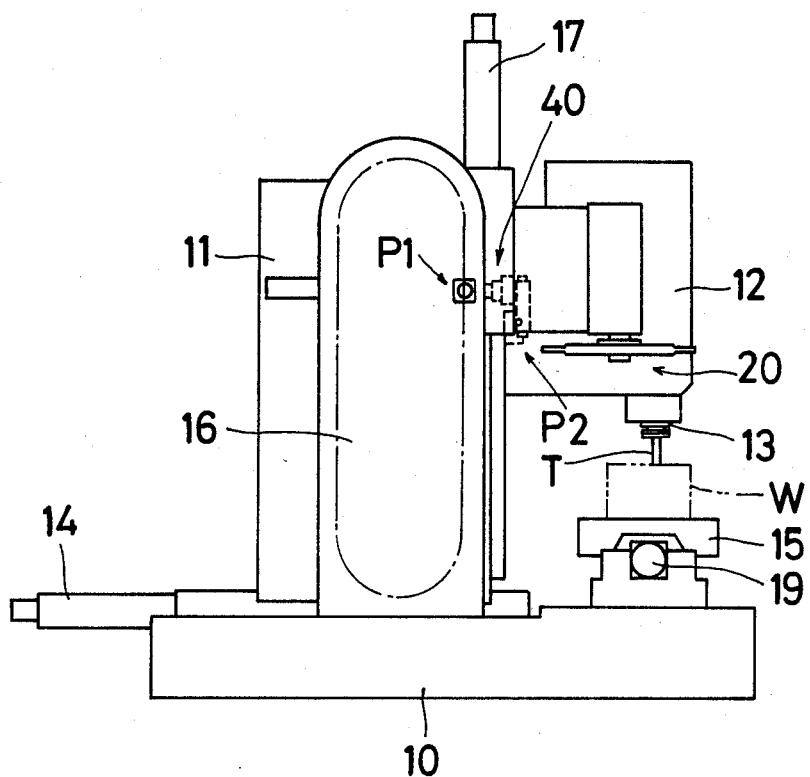
FIG. 1 is a side elevational view of a vertical machine tool provided with a tool transfer mechanism according to the present invention.

Referring now to the drawings and to FIG. 1 in particular, there is shown a bed 10 on which is mounted an upstanding column 11 so as to be slidable in a transverse direction. Feed movement of column 11 is controlled by a motor 14. A spindle head 12 is supported on a side surface of column 11 so as to be slidable in a vertical direction and is moved by a motor 17. A spindle 13 for removably holding a tool T is supported in spindle head 12 so as to be rotatable about a vertical axis and is driven by a conventional motor (not shown). A table 15 is mounted on bed 10 so as to be slidable in a longitudinal direction, and is moved by a motor 19. A workpiece W which is fixedly positioned on table 15 is machined by the tool T held on spindle 13 in accordance with relative movement of column 11, spindle head 12 and table 15.

A tool storage magazine 16 for storing tools T which are to be held on spindle 13 is secured on bed 10. A tool transfer mechanism 40 according to the present invention and a conventional tool change arm 20 are located between tool storage magazine 16 and spindle 13. Tool transfer mechanism 40 serves to transfer tool T between a gateway position P1 of tool storage magazine 16 and an exchange position P2 adjacent spindle 13, with a change in posture of tool T transferred thus occurring between a horizontal posture at gateway position P1 and a vertical posture at exchange position P2. Tool change arm 20 is designed to exchange tool T transferred to exchange position P2 by tool transfer mechanism 40 and tool T held in spindle 13.

Figure 2:
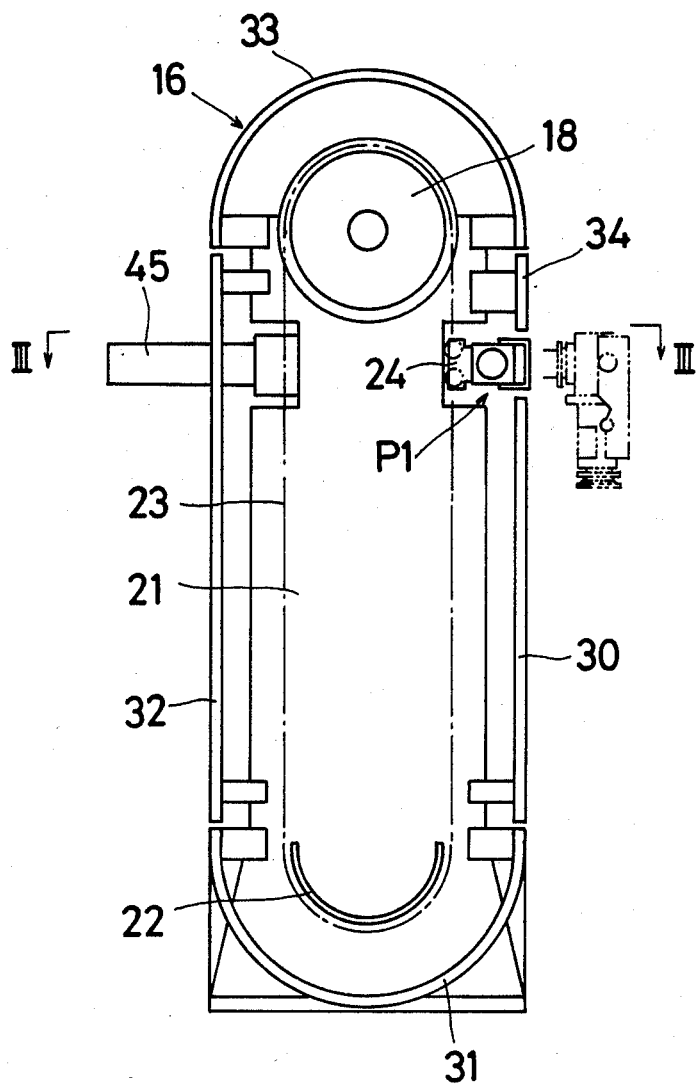
FIG. 2 is a front elevational view of a tool storage magazine shown in FIG. 1.

Referring now to FIG. 2, tool storage magazine 16 has a support frame 21 which is upstandingly fixed to bed 10. A sprocket wheel 18 is rotatably mounted on an upper portion of support frame 21 and a guide rail 22 is attached to a lower portion of support frame 21. An endless chain 23 is wound round sprocket wheel 18 in meshing engagement therewith and is also wound round guide rail 22. Sprocket wheel 18 is in driven connection with a motor (not shown) through a conventional gearing such as worm gearing.

Figure 3:
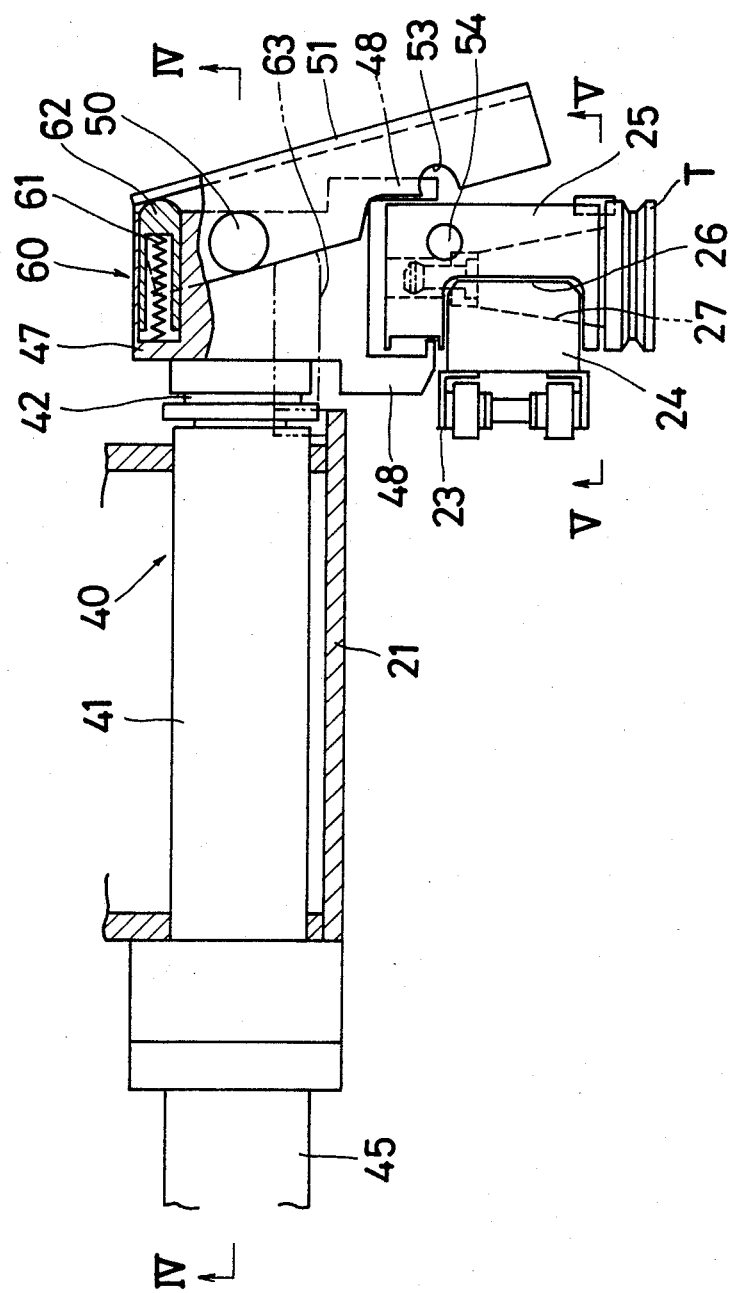
FIG. 3 is an enlarged sectional view taken along line III—III of FIG. 2.

As shown in FIG. 3, socket holders 24 are secured to chain 23 at regular intervals and with detachably support tool sockets 25, respectively. Accordingly, when chain 23 is rotationally indexed by the motor (not shown), a desired socket of said tool sockets 25 is shifted to gateway position P1.

Figure 5:
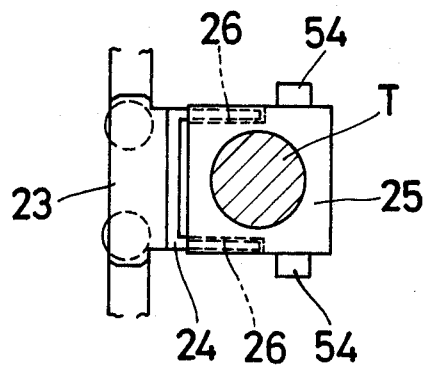
FIG. 5 is a sectional view taken along line V—V of FIG. 3.

Each tool socket 25 has respective engagement recesses 26 on opposite sides thereof as shown in FIG. 5. Socket holder 24 is provided with first and second projections which are respectively engaged with engagement recesses 26. Guide rails 30, 31, 32, 33 and 34 (FIG. 2) are secured to support frame 21 so as to guide each outside portion of tool socket 25 so that tool socket 25 is continuously held on socket holder 24. However, an opening is provided between guide rails 30, 34 at gateway position P1 so that tool socket 25 may be removed outwardly from socket holder 24. Tool T is inserted into a tapered bore 27 of tool socket 25 and is detachably maintained therein in a conventional manner, that is, a pull stud of tool T is engaged with a detent (not shown) which is biased by a spring toward the pull stud.

Figure 4:
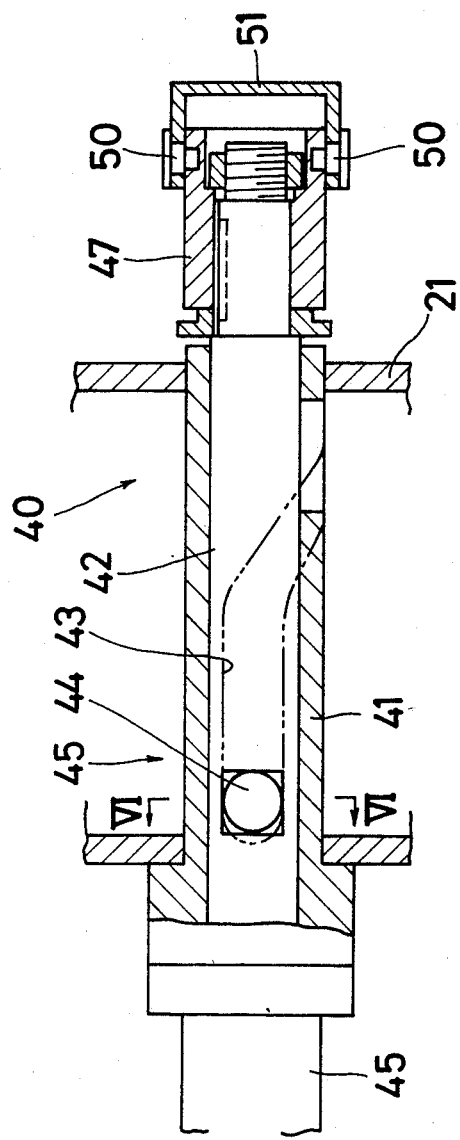
FIG. 4 is a sectional view taken along line IV—IV of FIG. 3.
Figure 6:
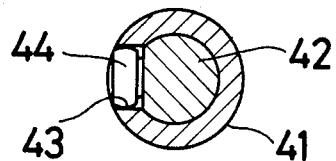
FIG. 6 is a sectional view taken along lines VI—VI of FIG. 4.

Referring now to FIGS. 3 and 4, a tool transfer mechanism 40 according to the present invention has a guide sleeve 41 that is attached to supported frame 21. Reference numeral 42 designates a shaft which is slidably fitted with guide sleeve 41. An actuator for moving shaft 42 is axially provided, that is, shaft 42 is rotatably connected to a piston rod of a hydraulic cylinder 45 which is fixed to support frame 21. A twisted grooved cam 43 is axially formed on the guide sleeve 41 and is engaged with a follower, such as a roller 44, that is attached to shaft 42 as shown in FIG. 6 so that shaft 42 is rotated through a 90° angle when shaft 42 is axially moved by hydraulic cylinder 45.

A base 47 is fixedly mounted on a front end of shaft 42. A pair of support jaws 48 are formed on base 47, leaving a space therebetween, so that a rear portion of tool socket 25 is allowed to pass therebetween. Therefore, when base 47 is positioned at gateway position P1, a desired tool socket 25 is indexable between jaws 48 in accordance with indexing movement of chain 23. Tool socket 25 is also prevented from being separated from socket holder 24 by jaws 48.

A holding arm 51 is pivotally mounted on base 47 by means of pin 50. Holding arm 51 has side walls to accommodate the outside portion of tool socket 25 when arm 51 is swung toward tool socket 25. The side walls of holding arm 51 are respectively provided with engaging notches 53 which are engageable with stubs 54 which project from respective sides of tool socket 25.

A tool engaging contact member 60 is positioned as shown in FIG. 3 and which includes a plunger 62 slidably mounted on base 47 wherein plunger 62 is biased by a spring 61 toward a rear end portion of holding arm 51. Accordingly, holding arm 51 is resiliently pivotable so that engaging notches 53 thereof engage with stubs 54 to hold tool sockets 25 on base 47. When base 47 is arranged as shown in FIG. 3 holding arm 51 abuts an abutment 63 which is fixed to support frame 21, so that holding arm 51 is swung outwardly to be positioned away from tool socket 25. The length of abutment 63 is so arranged that engaging notches 53 engage with stubs 54 before tool socket 25 is separated from the first and second projections of socket holder 24 upon the rightward or forward movement of base 47.

The operation of the tool transfer mechanism 40 as constructed above will now be described. While the workpiece W is machined by tool T held on spindle 13, endless chain 23 is indexed to position at gateway position P1 a tool T which is to be next used and which is oriented such that its longitudinal axis is parallel to remaining tools in the tool storage magazine 16. At this time base 47 is oriented as shown in FIG. 3 and holding arm 51 is thus positioned so as to be pivoted outwardly due to abutting engagement with abutment 63 so that tool sockets 25 held in tool storage magazine 16 may pass by or between jaws 48 without interferring with holding arm 51 during indexing movement of endless chain 23.

Upon completion of a machining operation by a tool T located on spindle 13, a tool change command is generated from a numerical control device (not shown). According to the tool change command, spindle head 12 is moved upward to a tool change position and column 11 is moved to a tool change position. At the same time base 47 is moved to the right in FIG. 3 by cylinder 45. According to such rightward movement of base 47, tool socket 25 which is located at gateway position P1 is removed from socket holder 24 by being engaged by jaw 48, and is held on base 47 by engagement of notches 53 with stubs 54.

When base 47 and shaft 42 is further moved rightward by cylinder 45, shaft 42 together with base 47 are rotated through a 90° angle because of cooperation of twisted groove cam 43 with roller 44. Accordingly tool socket 25 which is held on base 47 is rotated to change the posture of tool T that is inserted in tapered bore 27 of tool socket 25 from a horizontal posture at gateway position P1 to a vertical posture at exchange position P2 so that the longitudinal axis of tool T is parallel to that of spindle 13. When base 47 is forwarded to exchange position P2, a tool change arm 20 is rotated to simultaneously grasp tools T, T which are respectively held in tool socket 25 and in spindle 13. Thereafter tool change arm 20 is moved downward to pull such tools T, T out from tool socket 25 and out from spindle 13 and is rotated through a 180° angle to thus exchange the position of tools T, T.

Tool change arm 20 is then shifted upward to insert the exchanged tools in tool socket 25 and spindle 13, releases such tools T, T and finally is rotated to a neutral position. Upon completion of changing of tools T, T spindle head 12 is moved downward and column 11 is forwarded to machine workpiece W with new tool T. Concurrently base 47 is moved backward by cylinder 45, and accordingly tool socket 25 which holds previously used tool T is reversely rotated through a 90° angle upon cooperation of cam 43 with roller 44, so that the posture of tool T is changed from vertical to horizontal. When base 47 is located at gateway position P1, recesses 26 of tool socket 25 are engaged with projections of socket holder 24, and holding arm 51 abuts with abutment 63 so to be pivoted outwardly upon disengagement of notches 53 from stubs 54. Subsequently tool storage magazine 16 indexes tool socket 25 which positions the next tool T at gateway position P1.

Although in the above-described embodiments, shaft 42 together with base 47 is rotated by cam 43 and roller 44 mechanism, the same effect as in the above-described embodiments can be obtained in the case where a pinion is attached to shaft 42 and a rack which is reciprocated by a cylinder is engaged with the pinion.

Furthermore, should it be required, tool T might be solely transferred by the tool transfer mechanism without being held in tool socket 25.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A tool transfer mechanism for transferring a tool socket selected from a plurality of tool sockets between a gateway position of a tool storage magazine within which said plurality of tool sockets are stored and an exchange position adjacent a spindle, each of said tool sockets removably receiving a tool therein, said mechanism comprising:

a frame;

a base slidably mounted on said frame for movement in a first direction perpendicular to a second direction in which said plurality of tool sockets are moved across said gateway position, said base having a pair of jaw members having a space therebetween for permitting said plurality of tool sockets to pass across said gateway position in said second direction, and for preventing a selected tool socket indexed at said gateway position from being removed from said base in said first direction;

an actuator for moving said base between said gateway position and said exchange position spaced in said first direction;

holding arm means movably mounted on said base and engageable with said selected tool socket received in said space between said jaw members for holding said selected tool socket against movement in said second direction wherein said holding arm means comprises a pair of side wall portions for accommodating said selected tool socket therein so as to prevent said selected tool socket from being removed from said base in said second direction;

resilient means connected to said base for urging said holding arm means toward engagement with said selected tool socket;

means for releasing said holding arm means from said selected tool socket when said base is located at said gateway position such that said plurality of tool sockets are permitted to pass through said space between said pair of jaw members during tool indexing movement of said tool storage magazine; and means for rotating said base to change a posture of said selected tool socket held on said base between a first posture at said gateway position such that said selected tool socket is oriented parallel with said plurality of tool sockets in said tool storage magazine and a second posture at said exchange position such that said selected tool socket is oriented parallel with said spindle.

2. A tool transfer mechanism as set forth in claim 1, further comprising:

a shaft guided by said frame for axial sliding movement in said first direction and for rotation about an axis thereof, said shaft carrying said base; and wherein said rotating means further comprises a twisted grooved cam means axially forward on said frame and follower means attached to said shaft for engaging with said cam means.

3. A tool transfer mechanism as set forth in claim 1, wherein said means for releasing said holding arm means further comprises an abutment member fixed to said frame for abutting said holding arm means when said base is positioned at said gateway position.

4. A tool transfer mechanism as set forth in claim 3, further comprising means for pivotably mounting said holding arm means on said base.

5. A tool transfer mechanism as set forth in claim 4, wherein said plurality of tool sockets stored in said tool storage magazine extend horizontally, wherein said spindle extends vertically, and wherein said first and second postures are respectively horizontal and vertical postures.

6. A tool transfer mechanism as set forth in claim 1, wherein:

each of said tool sockets is provided with a pair of stubs projecting from opposite sides thereof in said second direction; and said side wall portions of said holding arm means are respectively formed with notches engageable with said stubs of each tool socket for preventing said each tool socket held on said base from being removed from said base in an axial direction thereof.

* * * * *